(12) United States Patent
Ikeda et al.

(10) Patent No.: US 11,371,611 B2
(45) Date of Patent: Jun. 28, 2022

(54) SEAL MEMBER FOR BEARING AND PRODUCTION METHOD THEREFOR

(71) Applicant: UCHIYAMA MANUFACTURING CORP., Okayama (JP)

(72) Inventors: Keiko Ikeda, Okayama (JP); Yoshihiko Yamaguchi, Okayama (JP); Tomohisa Yamamoto, Okayama (JP); Tatsuo Katayama, Akaiwa (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 159 days.

(21) Appl. No.: 16/813,015

(22) Filed: Mar. 9, 2020

(65) Prior Publication Data

US 2020/0300363 A1 Sep. 24, 2020

(30) Foreign Application Priority Data

Mar. 19, 2019 (JP) .............................. JP2019-051861

(51) Int. Cl.
| | | |
|---|---|---|
| *F16J 15/32* | (2016.01) | |
| *F16J 15/30* | (2006.01) | |
| *B29C 37/00* | (2006.01) | |
| *F16J 15/328* | (2016.01) | |
| *F16J 15/28* | (2006.01) | |

(52) U.S. Cl.
CPC ............ *F16J 15/30* (2013.01); *B29C 37/0007* (2013.01); *F16J 15/28* (2013.01); *F16J 15/328* (2013.01)

(58) Field of Classification Search
CPC ............. F16J 15/28; F16J 15/30; F16J 15/328
See application file for complete search history.

(56) References Cited

FOREIGN PATENT DOCUMENTS

| | | | | |
|---|---|---|---|---|
| JP | 2004353709 A | 12/2004 | | |
| JP | 2012097213 A | 5/2012 | | |
| WO | WO-2017033986 A1 | * | 3/2017 | ........... F16J 15/3284 |

* cited by examiner

*Primary Examiner* — Gilbert Y Lee

(74) *Attorney, Agent, or Firm* — Buchanan, Ingersoll & Rooney PC

(57) ABSTRACT

There is provided a seal member for a bearing comprising a molded rubber article and a core metal, wherein the molded rubber article is produced by vulcanization-molding a rubber composition comprising 100 parts by mass of a rubber (A) containing an acrylic acid ester as a main component, 1 to 30 parts by mass of a carbon material (B), and 10 to 100 parts by mass of a carbon black (C) having a DBP oil absorption of 20 mL/100 g or more and less than 150 mL/100 g; the carbon material (B) is a carbon nanotube (B1) or a carbon black (B2) having a DBP oil absorption of 150 mL/100 g or more and 1000 mL/100 g or less; and a volume resistivity of the molded rubber article is $1 \times 10^6$ Ω·cm or less.

8 Claims, No Drawings

SEAL MEMBER FOR BEARING AND PRODUCTION METHOD THEREFOR

TECHNICAL FIELD

The present invention relates to a seal member for a bearing comprising a molded rubber article and a core metal. The present invention also relates to a method for producing the seal member.

BACKGROUND ART

An axle of an automobile is supported by a rolling bearing, which is equipped with a component called a seal member for preventing leakage of a grease and invasion of muddy water. The seal member is made of an annular core metal whose surface is covered with a molded rubber article, and for this seal member, a conductive molded rubber article is used for suppressing electromagnetic noise. Examples of a conductive rubber composition used for a seal member include a nitrile rubber composition as described in Patent Reference No. 1 or 2.

Patent Reference No. 1 has described the use of a molded article produced by vulcanizing a nitrile rubber composition comprising 5 to 50 parts by weight of a carbon black, 5 to 60 parts by weight of graphite having an average particle size of 5 μm or less and 5 to 50 parts by weight of another conductive carbon based on 100 parts by weight of a nitrile rubber, wherein the total amount of carbon black, graphite and the other conductive carbon is 10 to 100 parts by weight based on 100 parts by weight of the nitrile rubber, as an oil seal for a rolling bearing.

Patent Reference No. 2 has described a rolling bearing unit for supporting an axle equipped with a seal ring which is a molded article produced by vulcanizing a conductive rubber material composition prepared by blending an acrylonitrile-butadiene rubber with a conductive carbon black and a needle conductive filler having a diameter of 0.2 to 1.0 μm.

Since an automobile is frequently used under a severe environment, a molded rubber article used for a seal member is required to have physical properties capable of withstanding the use under a high-temperature environment. An acrylic rubber is more heat-resistant than a nitrile rubber, and thus, the use thereof for a seal member for a bearing has been investigated.

Here, a seal member is generally produced by filling a core metal and a rubber composition containing a conductive material in a mold followed by heating it under pressure. There is, however, a problem that an acrylic rubber composition containing a conductive material is less releasable from a mold than a nitrile rubber composition. Poor mold-releasability may lead to not only lower productivity but also breakage of a molded rubber article covering the surface of the core metal.

PRIOR ART REFERENCES

Patent References

Patent Reference No. 1: JP 2012-97213 A
Patent Reference No. 2: JP 2004-353709 A

SUMMARY OF THE INVENTION

Problems to be Solved by the Invention

To solve the above problems, an objective of the present invention is to provide a seal member which is highly conductive and highly mold-releasable in the course of production thereof.

Means for Solving the Problems

The above problems are solved by providing a seal member for a bearing comprising a molded rubber article and a core metal, wherein the molded rubber article is produced by vulcanization-molding a rubber composition comprising 100 parts by mass of a rubber (A) containing an acrylic acid ester as a main component, 1 to 30 parts by mass of a carbon material (B), and 10 to 100 parts by mass of a carbon black (C) having a DBP oil absorption of 20 mL/100 g or more and less than 150 mL/100 g; the carbon material (B) is a carbon nanotube (B1) or a carbon black (B2) having a DBP oil absorption of 150 mL/100 g or more and 1000 mL/100 g or less; and a volume resistivity of the molded rubber article is $1 \times 10^6$ Ω·cm or less.

It is here preferred that the rubber composition further comprises 5 to 100 parts by mass of a white filler (D). It is also preferred that the rubber composition further comprises 1 to 10 parts by mass of a processing aid (E).

The above problems are also solved by providing a method for producing the seal member, comprising a kneading step of kneading the rubber (A), the carbon material (B) and the carbon black (C), to prepare the rubber composition; and a vulcanization step of vulcanization-molding the rubber composition on the core metal.

It is here preferred that in the kneading step, a white filler (D) is further kneaded. It is also preferred that in the kneading step, a processing aid (E) is further kneaded.

Effects of the Invention

A molded rubber article used for a seal member of the present invention is highly conductive, so that a bearing having the seal member can effectively prevent electromagnetic noise. Furthermore, the seal member of the present invention is highly mold-releasable in the course of production thereof, resulting in excellent productivity.

MODES FOR CARRYING OUT THE INVENTION

A molded rubber article in a seal member of the present invention is produced by vulcanization-molding a rubber composition comprising a rubber (A) containing an acrylic acid ester as a main component, a carbon material (B) and a carbon black (C).

The rubber (A) used in the present invention is a rubber containing an acrylic acid ester as a main component. The phrase, "containing an acrylic acid ester as a main component", means that a content of units derived from an acrylic acid ester in the rubber (A) is 50% by mass or more. A content of units derived from an acrylic acid ester is preferably 60% by mass or more.

Examples of an acrylic acid ester which can be suitably used include methyl acrylate, ethyl acrylate, butyl acrylate and methoxyethyl acrylate. Examples of a monomer to be copolymerized with an acrylic acid ester include acrylonitrile and ethylene. Specifically, in accordance with the applications, an acrylic rubber (ACM) produced by copolymerizing an acrylic acid ester and a crosslinkable monomer; an acrylic rubber (AEM) produced by copolymerizing an acrylic acid ester, ethylene and a crosslinkable monomer; and an acrylic rubber (ANM) produced by copolymerizing an acrylic acid ester, acrylonitrile and a crosslinkable monomer can be used. Examples of a crosslinkable monomer include a crosslinkable monomer having an epoxy group, a crosslinkable monomer having a carboxyl group, a crosslinkable monomer having an active chlorine group, and a crosslinkable monomer having a plurality of carbon-carbon double bonds.

A carbon material (B) used in the present invention is a carbon nanotube (B1), or a carbon black (B2) having a DBP oil absorption of 150 mL/100 g or more and 1000 mL/100 g or less. The carbon material (B) is added in order to make a molded rubber article conductive, and it can be used to provide a molded rubber article with a lower volume resistivity.

A carbon material (B) used in the present invention is a carbon nanotube (B1). Examples of a carbon nanotube (B1) (hereinafter, a carbon nanotube is sometimes abbreviated as "CNT") include a monolayer carbon nanotube and a multilayer carbon nanotube. When conductivity is valued, a monolayer CNT is suitable, while when a cost is valued, a multilayer CNT is suitable. An average diameter of CNT (B1) is preferably, but not limited to, 1 nm or more while being preferably 100 nm or less, more preferably 50 nm or less, further preferably 20 nm or less. An aspect ratio (average length/average diameter) is preferably, but not limited to, 100 to 100000. Examples of a monolayer CNT include "ZEONANO SG101" from Zeon Corporation and "TUBALL" from OCSiAl. Examples of a multilayer CNT include "FloTube 7000" and ", FloTube 9000" from CNano-Technology and "NC7000" from Nanocyl SA.

A carbon material (B) used in the present invention is a carbon black (B2) having a DBP oil absorption of 150 mL/100 g or more and 1000 mL/100 g or less. A DBP oil absorption denotes the amount (in mL) of dibutyl phthalate (DBP) which can be absorbed by 100 g of a carbon black (in accordance with JIS K6217-4). As an aggregate or agglomerate structure develops in a carbon black (B2), a DBP oil absorption increases. Furthermore, a highly conductive carbon material generally has a larger DBP oil absorption.

If a DBP oil absorption of the carbon black (B2) is less than 150 mL/100 g, conductivity of a molded rubber article is insufficient. For achieving higher conductivity, a DBP oil absorption of the carbon black (B2) is preferably 300 mL/100 g or more, more preferably 400 mL/100 g or more. If the DBP oil absorption is more than 1000 mL/100 g, fluidity of a rubber composition may be deteriorated. The DBP oil absorption is preferably 800 mL/100 g or less.

There are no particular restrictions to the type of a carbon black (B2) as long as a DBP oil absorption is within the above range and a molded rubber article produced has a volume resistivity of a certain value or less. Specific examples include "KETJENBLACK EC300J" and "KETJENBLACK EC600JD" from Lion Specialty Chemicals Co., Ltd., "Acetylene Black" from Denka Company Limited., "VULCAN® XC-72" from Cabot Corporation, "Conductex 7055 Ultra" from Colombian International Corporation, and "Printex XE2 B" from Evonik Degussa Corporation. In a carbon black, an aggregate or agglomerate structure is highly developed and primary particles are hollow, so that a small amount of the carbon black is enough to make an article conductive.

A content of the carbon material (B) is 1 to 30 parts by mass based on 100 parts by mass of the rubber (A). If the content of the carbon material (B) is less than 1 part by mass, conductivity of a molded rubber article is insufficient. For achieving higher conductivity, the content of the carbon material (B) is preferably 3 parts by mass or more, more preferably 5 parts by mass or more, further preferably 8 parts by mass or more. If the content of the carbon material (B) is more than 30 parts by mass, releasability from a mold is deteriorated. The content of the carbon material (B) is preferably 25 parts by mass or less.

When conductivity of a molded rubber article is valued, the carbon material (B) is suitably CNT (B1), while when a cost is valued, the carbon material (B) is a carbon black (B2).

A DBP oil absorption of a carbon black (C) used in the present invention is 20 mL/100 g or more and less than 150 mL/100 g. In the carbon black (C), an aggregate or agglomerate structure is not as developed as the carbon material (B). Major part of carbon blacks added to a common rubber composition belong to this.

If a DBP oil absorption of the carbon black (C) is 150 mL/100 g or more, moldability of a rubber composition may be deteriorated. The DBP oil absorption of the carbon black (C) is preferably 100 mL/100 g or less, more preferably 50 mL/100 g or less. The DBP oil absorption of the carbon black (C) is preferably 22 mL/100 g or more, more preferably 25 mL/100 g or more.

There are no particular restrictions to the type of a carbon black (C) as long as a DBP oil absorption is within the above range. Specifically, MT, FT, SRF, GPF, FEF, MAF, HAF, ISAF, SAF and the like can be used. In the light of balance between performance and a cost, MT, FT, SRF, and GPF are preferable. The carbon black (C) can be a combination of two or more.

A content of the carbon black (C) is 10 to 100 parts by mass based on 100 parts by mass of the rubber (A). If the content of the carbon black (C) is less than 10 parts by mass, releasability from a mold is deteriorated. The content of the carbon black (C) is preferably 15 parts by mass or more. When the carbon material (B) is a carbon black (B2), the content of the carbon black (C) is more preferably 30 parts by mass or more, further preferably 50 parts by mass or more. If the content of the carbon black (C) is more than 100 parts by mass, moldability of a rubber composition is deteriorated. The content of the carbon black (C) is preferably 95 parts by mass or less, more preferably 80 parts by mass or less.

In a seal member of the present invention, the rubber composition preferably contains 5 to 100 parts by mass of a white filler (D) based on 100 parts by mass of a rubber (A), in the light of improving adhesiveness between a molded rubber article and a core metal. If the content of the white filler (D) is less than 5 parts by mass, adhesiveness improvement as described above may not be achieved. The content of the white filler (D) is more preferably 8 parts by mass or more. If the content of the white filler (D) is more than 100 parts by mass, conductivity of a molded rubber article may be deteriorated. The content of the white filler (D) is more preferably 70 parts by mass or less, further preferably 30 parts by mass or less.

There are no particular restrictions to the type of the white filler (D), and fillers which are commonly used for a rubber composition can be used. Examples of such a filler include inorganic fillers such as silica, clay, calcium carbonate, diatomaceous earth, wollastonite, barium sulfate and titanium oxide; and organic fillers such as cellulose powder, regenerated rubber and powdered rubber. Among these, inorganic fillers are suitably used, and in the light of adhesiveness improvement, silica, clay, calcium carbonate and diatomaceous earth are suitably used. The white filler (D) can be a combination of two or more.

In the present invention, the rubber composition preferably contains 1 to 10 parts by mass of a processing aid (E) based on 100 parts by mass of a rubber (A). Using a rubber composition containing a processing aid (E), releasability from a mold is further improved. If the content of the processing aid (E) is less than 1 part by mass, improvement in mold releasability as described above may not be achieved. The content of the processing aid (E) is more preferably 2 parts by mass or more. If the content of the processing aid (E) is more than 10 parts by mass, insufficient adhesion or poor appearance may occur. The content of the processing aid (E) is preferably 8 parts by mass or less. There are no particular restrictions to the type of the processing aid (E); for example, various waxes and fatty acids.

As long as the effects of the present invention are not impaired, the rubber composition can contain, in addition to a rubber (A), a carbon material (B) and a carbon black (C), other components. Examples of the other components include, in addition to a white filler (D) and a processing aid (E) described above, various additives such as a vulcanizing agent, a vulcanization aid, a co-cross-linking agent, a vulcanization accelerator, a vulcanization retardant, an adhesive, an acid acceptor, a colorant, a filler, a plasticizer, an anti-aging agent, a coupling agent, a corrosion inhibitor and a tackifier.

In a seal member of the present invention, a volume resistivity of the above molded rubber article is $1\times10^6$ $\Omega\cdot$cm or less. If the volume resistivity of the molded rubber article is more than $1\times10^6$ $\Omega\cdot$cm, electromagnetic noise cannot be effectively prevented. The volume resistivity is preferably $8\times10^5$ $\Omega\cdot$cm or less, more preferably $1\times10^3$ $\Omega\cdot$cm or less, further preferably $1\times10^2$ $\Omega\cdot$cm or less, particularly preferably 10 $\Omega\cdot$cm or less. A "volume resistivity" as mentioned herein is a value obtained by measurement in accordance with JIS K6271-2 Method 3.

An A hardness of molded rubber article contained in a seal member of the present invention is preferably 50 to 90. The A hardness is more preferably 60 or more, further preferably 65 or more. Meanwhile, the A hardness is more preferably 80 or less, further preferably 75 or less.

There are no particular restrictions to a method for producing a seal member of the present invention, and a preferable method comprises a kneading step of kneading a rubber (A), a carbon material (B) and a carbon black (C), to prepare a rubber composition; and a vulcanization step of vulcanization-molding the rubber composition on the core metal.

In the kneading step, the rubber (A), the carbon material (B) and the carbon black (C) are preferably as described above. Furthermore, the contents thereof are preferably as described above. In the kneading step, it is preferable that a white filler (D) is further kneaded. In the kneading step, it is also preferable that a processing aid (E) is further kneaded. The white filler (D) and the processing aid (E) are preferably as described above. Furthermore, the contents thereof are preferably as described above.

In the kneading step, there are no particular restrictions to a method for blending the above components, and kneading can be performed using an open roll, a kneader, a Bambary mixer, an intermixes and an extruder. It is preferable that kneading is performed using an open roll or a kneader. A kneading temperature is preferably 20 to 160° C.

In the subsequent vulcanization step, the rubber composition obtained in the kneading step is vulcanization-molded on a core metal to provide a seal member of the present invention comprising a molded rubber article and a core metal. Examples of a core metal used herein include a metal plate or alloy plate made of iron, aluminum and/or stainless steel. The core metal can be surface-treated by, for example, plating. Examples of the core metal include SECC described in JIS G3313, SUS301 described in JIS G4305, and SPCC described in JIS G3141. In the light of improving adhesiveness between a molded rubber article and a core metal, an adhesive can be applied over the surface of the core metal. Examples of an adhesive include phenol adhesives, epoxy adhesives and silane coupling agents.

The shape of a core metal is, but not limited to, generally annular. There are no particular restrictions to thicknesses of a core metal and of a molded rubber article, and these can be appropriately determined, depending on a size of a rolling bearing and the like.

A rubber composition can be molded by, for example, injection molding, extrusion molding, compaction molding and roll forming. Among these, injection molding and compaction molding are suitable. Here, the composition can be vulcanized after pre-molding or vulcanized while being molded.

Alternatively, the composition can be vulcanized while being molded, followed by secondary vulcanization. Preferably, a vulcanization temperature is generally 150 to 230° C. A vulcanization time is generally 0.1 to 60 min. Vulcanization is conducted under heating by a common heating method such as heater heating, steam heating, oven heating and hot-air heating.

Depending on the shape or the dimensions of a molded rubber article, the surface is vulcanized while the inside may not be sufficiently vulcanized. Therefore, heating can be further continued for secondary vulcanization.

Vulcanization (crosslinking) can be conducted by an appropriate method including, but not limited to, sulfur vulcanization, peroxide vulcanization, amine vulcanization, triazine vulcanization, and crosslinking via an epoxy group. A vulcanizing agent used for sulfur vulcanization is sulfur or a sulfur-containing compound. A vulcanizing agent used for peroxide vulcanization is an organic peroxide. The amount of a vulcanizing agent is generally 0.1 to 10 parts by mass based on 100 parts by mass of a rubber (A). The amount of a vulcanization accelerator is generally 0.1 to 10 parts by mass based on 100 parts by mass of a rubber (A).

EXAMPLES

Acrylic rubber (ACM (A1))
    An epoxy-containing acrylic rubber "Nipol AR31" from Zeon Corporation,
    a content of acrylic acid ester units: 90% by mass or more
Acrylic rubber (ACM (A2))
    A carboxyl-containing acrylic rubber "Nipol AR14" from Zeon Corporation,
    a content of acrylic acid ester units: 90% by mass or more
Acrylic rubber (ACM (A3))
    A carboxyl-containing acrylic rubber "Nipol AR12" from Zeon Corporation,
    a content of acrylic acid ester units: 90% by mass or more
Ethylene acrylic rubber (AEM(A4))

An ethylene-acrylic rubber "VAMAC ULTRA LS" from DuPont de Nemours, Inc.,
a content of acrylic acid ester units: 60% by mass or more Acrylic rubber (ANM(A5))
An acrylic rubber (an acrylic rubber produced by copolymerizing an acrylic acid ester, acrylonitrile and an epoxy-containing crosslinkable monomer),
a content of acrylic acid ester units: 80% by mass or more Carbon material (b1)
"KETJENBLACK EC300J" from Lion Specialty Chemicals Co., Ltd.,
a carbon black having a DBP oil absorption of 365 mL/100 g Carbon material (b2)
"KETJENBLACK EC600JD" from Lion Specialty Chemicals Co., Ltd.,
a carbon black having a DBP oil absorption of 495 mL/100 g Carbon material (b3)
"VULCAN XC-72" from Cabot Corporation,
a carbon black having a DBP oil absorption of 175 mL/100 g.

Carbon material (b4)
"Acetylene Black" from Denka Company Limited,
a carbon black having a DBP oil absorption of 212 mL/100 g.

Carbon material (b5)
"ZEONANO SG101" which is a powdery monolayer carbon nanotube from Zeon Corporation.
An average diameter: 3 to 5 nm, length: several hundred μm Carbon material (b6)
"FloTube 7000" which is a powdery multilayer carbon nanotube from CNano Technology.
An average diameter: 8 to 15 nm, length: 5 to 20 μm Carbon material (b7)
"FloTube 9000" which is a powdery multilayer carbon nanotube from CNano Technology.
An average diameter: 10 to 15 nm, length: 10 μm or less Carbon black (C)
"Asahi Thermal" which is a FT carbon from Asahi Carbon Co., Ltd.
DBP oil absorption: 28 mL/100 g Silica (D1)
"Nipsil VN3" from Tosoh Silica Corporation Clay (D2)
Dixie clay from R. T. Vanderbilt Company, Inc.

Calcium carbonate (D3)
"Akadamajirushi" which is light calcium carbonate from Taiyo Kagaku Co., Ltd.

Processing aid (E)
"Grec G-8205" which is an ester wax from NI Chemitec Corporation.

Vulcanizing agent (F1)
"Diak-1" from DuPont de Nemours, Inc.

Vulcanizing agent (F2)
"NOCCELER PZ" from Ouchi Shinko Chemical Industrial Co., Ltd.

Vulcanization accelerator (G1)
"NOCCELER TTFE" from Ouchi Shinko Chemical Industrial Co., Ltd.

Vulcanization accelerator (G2)
"NOCCELER DT" from Ouchi Shinko Chemical Industrial Co., Ltd.

Example 1

(Preparation of a Vulcanized Rubber Sheet)

A mixture or partially masterbatched mixture having a composition shown in Table 1 was kneaded at a temperature of 40 to 70° C. for 15 to 30 min using an open roll to obtain an unvulcanized rubber sheet with a thickness of 2.0 to 3.0 mm. Subsequently, the unvulcanized rubber sheet thus obtained was press-vulcanized at 180° C. for 15 min, to provide a vulcanized rubber sheet with a dimension of 150 mm (length)×150 mm (width)×2 mm (thickness), which was then subjected to secondary vulcanization in an oven at 180° C. for 4 hours (hereinafter, sometimes abbreviated as a "rubber sheet").

[Evaluation]
(Hardness Measurement)

Three rubber sheets were piled and hardness thereof was measured using a type A durometer at 23° C., to read a peak value. As a result, an A hardness was 73. The results are shown in Table 1.

(Measurement of a Volume Resistivity)

By a method in accordance with JIS K6271-2 Method 3, a volume resistivity of a rubber sheet obtained was measured. The results are shown in Table 1.

(Releasability From a Mold)

Using an open roll, an unvulcanized rubber sheet was prepared as described in "Preparation of a vulcanized rubber sheet". Then, a core metal (cold rolled steel sheet) was placed in a mold, and the unvulcanized rubber sheet was placed on the core metal and it was pressed at 180° C. and 60 kgf/cm$^2$ for 15 min for vulcanization-molding. After the vulcanization-molding, releasability between the mold and the seal member was evaluated by the following criteria. The results are shown in Table 1.

A: a seal member was able to be easily released from a mold.

B: a seal member was able to be released although it stuck to a mold.

C: a seal member was not able to be released from a mold.

(Adhesiveness to a Core Metal)

An unvulcanized rubber sheet was prepared as described in "Preparation of a vulcanized rubber sheet". Then, the sheet was evaluated in accordance with JIS K6256, a 90° peel test. In the evaluation method, an unvulcanized rubber sheet was placed on an adhesive-applied rigid plate, which was then pressed at 180° for 15 min for vulcanization-molding. The adhered molded rubber article was peeled in a 90 direction. A proportion (%) of the area of the remaining molded rubber article on the rigid plate to the area of the molded rubber article before peeling was determined. The evaluation criteria are as described below, and the results are shown in Table 1.

A: 80% or more
B: 50% or more and less than 80%

Examples 2 to 17 and Comparative Examples 1 to 3

Rubber compositions were obtained as described in Example 1, except that the types and the amounts of components in "Preparation of a vulcanized rubber sheet" were changed as shown in Tables 1 to 3. Then, the rubber compositions obtained were used for evaluation as described in Example 1. The results are shown in Tables 1 to 3.

TABLE 1

|  | Example 1 | Example 2 | Example 3 | Example 4 | Example 5 | Example 6 | Example 7 |
|---|---|---|---|---|---|---|---|
| Composition of a rubber composition | | | | | | | |
| ACM (A1) | 100 | — | — | — | — | 100 | 100 |
| ACM (A2) | — | 100 | — | — | — | — | — |
| ACM (A3) | — | — | 100 | — | — | — | — |
| AEM (A4) | — | — | — | 100 | — | — | — |
| ANM (A5) | — | — | — | — | 100 | — | — |
| Carbon material (b1) | 10 | 10 | 10 | 10 | 10 | — | — |
| Carbon material (b2) | — | — | — | — | — | 10 | — |
| Carbon material (b3) | — | — | — | — | — | — | 25 |
| Carbon material (b4) | — | — | — | — | — | — | — |
| Carbon material (b5) | — | — | — | — | — | — | — |
| Carbon material (b6) | — | — | — | — | — | — | — |
| Carbon material (b7) | — | — | — | — | — | — | — |
| Carbon black (C) | 65 | 65 | 65 | 65 | 65 | 65 | 65 |
| Silica (D1) | 10 | 10 | 10 | 10 | 10 | 10 | 10 |
| Clay (D2) | — | — | — | — | — | — | — |
| Calcium carbonate (D3) | — | — | — | — | — | — | — |
| Processing aid (E) | 5 | 5 | 5 | 5 | 5 | 5 | 5 |
| Vulcanizing agent (F1) | — | 0.5 | 0.5 | 1.25 | — | — | — |
| Vulcanizing agent (F2) | 1 | — | — | — | 1 | 1 | 1 |
| Vulcanization accelerator (G1) | 0.5 | — | — | — | 0.5 | 0.5 | 0.5 |
| Vulcanization accelerator (G2) | — | 2 | 2 | 4 | — | — | — |
| Evaluation results | | | | | | | |
| Hardness | 73 | 72 | 74 | 73 | 73 | 72 | 75 |
| Volume resistivity(Ω · cm) | $4.3 \times 10^1$ | $4.8 \times 10^1$ | $5.2 \times 10^1$ | $3.8 \times 10^1$ | $4.5 \times 10^1$ | $2.5 \times 10^1$ | $4.3 \times 10^1$ |
| Releasability from a mold | A | A | A | A | A | A | A |
| Adhesiveness | A | A | A | A | A | A | A |

TABLE 2

|  | Example 8 | Example 9 | Example 10 | Example 11 | Example 12 | Example 13 | Example 14 |
|---|---|---|---|---|---|---|---|
| Composition of a rubber composition | | | | | | | |
| ACM (A1) | 100 | — | 100 | 100 | 100 | 100 | 100 |
| ACM (A2) | — | — | — | — | — | — | — |
| ACM (A3) | — | 100 | — | — | — | — | — |
| AEM (A4) | — | — | — | — | — | — | — |
| ANM (A5) | — | — | — | — | — | — | — |
| Carbon material (b1) | — | — | — | — | 10 | 10 | 10 |
| Carbon material (b2) | — | — | — | — | — | — | — |
| Carbon material (b3) | — | — | — | — | — | — | — |
| Carbon material (b4) | 25 | — | — | — | — | — | — |
| Carbon material (b5) | — | 5 | — | — | — | — | — |
| Carbon material (b6) | — | — | 10 | — | — | — | — |
| Carbon material (b7) | — | — | — | 5 | — | — | — |
| Carbon black (C) | 65 | 20 | 20 | 20 | 65 | 65 | 65 |
| Silica (D1) | 10 | 10 | 10 | 10 | — | — | — |
| Clay (D2) | — | — | — | — | 10 | — | — |
| Calcium carbonate (D3) | — | — | — | — | — | 10 | — |
| Processing aid (E) | 5 | 5 | 5 | 5 | 5 | 5 | 5 |
| Vulcanizing agent (F1) | — | 0.5 | — | — | — | — | — |
| Vulcanizing agent (F2) | 1 | — | 1 | 1 | 1 | 1 | 1 |
| Vulcanization accelerator (G1) | 0.5 | — | 0.5 | 0.5 | 0.5 | 0.5 | 0.5 |
| Vulcanization accelerator (G2) | — | 2 | — | — | — | — | — |
| Evaluation results | | | | | | | |
| Hardness | 76 | 65 | 62 | 65 | 72 | 73 | 70 |
| Volume resistivity(Ω · cm) | $4.9 \times 10^1$ | $7.1 \times 10^0$ | $6.5 \times 10^0$ | $2.2 \times 10^1$ | $4.2 \times 10^1$ | $3.5 \times 10^1$ | $3.3 \times 10^1$ |
| Releasability from a mold | A | A | A | A | A | A | A |
| Adhesiveness | A | A | A | A | A | A | B |

TABLE 3

|  | Example 15 | Example 16 | Example 17 | Comparative Example 1 | Comparative Example 2 | Comparative Example 3 |
|---|---|---|---|---|---|---|
| Composition of a rubber composition | | | | | | |
| ACM (A1) | 100 | 100 | — | 100 | 100 | — |
| ACM (A2) | — | — | — | — | — | — |

TABLE 3-continued

| | Example 15 | Example 16 | Example 17 | Comparative Example 1 | Comparative Example 2 | Comparative Example 3 |
|---|---|---|---|---|---|---|
| ACM (A3) | — | — | 100 | — | — | 100 |
| AEM (A4) | — | — | — | — | — | — |
| ANM (A5) | — | — | — | — | — | — |
| Carbon material (b1) | 10 | — | — | 10 | 35 | — |
| Carbon material (b2) | — | 2 | — | — | — | — |
| Carbon material (b3) | — | — | — | — | — | — |
| Carbon material (b4) | — | — | — | — | — | — |
| Carbon material (b5) | — | — | 1 | — | — | 0.5 |
| Carbon material (b6) | — | — | — | — | — | — |
| Carbon material (b7) | — | — | — | — | — | — |
| Carbon black (C) | 65 | 90 | 50 | — | — | 50 |
| Silica (D1) | 10 | 10 | 10 | — | 10 | 10 |
| Clay (D2) | — | — | — | 40 | — | — |
| Calcium carbonate (D3) | — | — | — | — | — | — |
| Processing aid (E) | — | 5 | 5 | 5 | 5 | 5 |
| Vulcanizing agent (F1) | — | — | 0.5 | — | — | 0.5 |
| Vulcanizing agent (F2) | 1 | 1 | — | 1 | 1 | — |
| Vulcanization accelerator (G1) | 0.5 | 0.5 | — | 0.5 | 0.5 | — |
| Vulcanization accelerator (G2) | — | — | 2 | — | — | 2 |
| Evaluation results | | | | | | |
| Hardness | 75 | 67 | 66 | 71 | 92 | 65 |
| Volume resistivity($\Omega \cdot$ cm) | $4.6 \times 10^1$ | $6.2 \times 10^5$ | $5.6 \times 10^4$ | $4.8 \times 10^1$ | $1.1 \times 10^1$ | $8.5 \times 10^8$ |
| Releasability from a mold | B | A | A | C | C | A |
| Adhesiveness | A | A | A | A | A | A |

The invention claimed is:

1. A seal member for a bearing comprising a molded rubber article and a core metal, wherein
    the molded rubber article is produced by vulcanization-molding a rubber composition comprising 100 parts by mass of an acrylic rubber (A) containing an acrylic acid ester as a main component, 1 to 30 parts by mass of a carbon material (B), and 10 to 100 parts by mass of a carbon black (C) having a DBP oil absorption of 20 mL/100 g or more and less than 150 mL/100 g;
    the carbon material (B) is a carbon nanotube (B1) or a carbon black (B2) having a DBP oil absorption of 150 mL/100 g or more and 1000 mL/100 g or less; and
    a volume resistivity of the molded rubber article is $1 \times 10^6$ $\Omega \cdot$cm or less.

2. The seal member according to claim 1, wherein the rubber composition further comprises 5 to 100 parts by mass of a white filler (D).

3. The seal member according to claim 1, wherein the rubber composition further comprises 1 to 10 parts by mass of a processing aid (E).

4. The seal member according to claim 2, wherein the rubber composition further comprises 1 to 10 parts by mass of a processing aid (E).

5. A method for producing the seal member according to claim 1, comprising
    a kneading step of kneading the acrylic rubber (A), the carbon material (B) and the carbon black (C), to prepare the rubber composition; and
    a vulcanization step of vulcanization-molding the rubber composition on the core metal.

6. The production method according to claim 5, wherein in the kneading step, a white filler (D) is further kneaded.

7. The production method according to claim 5, wherein in the kneading step, a processing aid (E) is further kneaded.

8. The production method according to claim 6, wherein in the kneading step, a processing aid (E) is further kneaded.

* * * * *